(12) United States Patent

Lee

(10) Patent No.: US 12,579,085 B1
(45) Date of Patent: Mar. 17, 2026

(54) MULTI-BUS REPLICATOR USING RF SERIALIZER/DESERIALIZER FOR CHIP-TO-CHIP INTERCONNECT

(71) Applicant: TEXAS MILKYWAY INC., Plano, TX (US)

(72) Inventor: Sheau-Jiung Lee, Plano, TX (US)

(73) Assignee: TEXAS MILKYWAY INC., Plano, TX (US)

( * ) Notice: Subject to any disclaimer, the term of this patent is extended or adjusted under 35 U.S.C. 154(b) by 0 days.

(21) Appl. No.: 18/961,414

(22) Filed: Nov. 26, 2024

(51) Int. Cl.
G06F 13/16 (2006.01)
G06F 13/42 (2006.01)

(52) U.S. Cl.
CPC ...... G06F 13/1684 (2013.01); G06F 13/4234 (2013.01)

(58) Field of Classification Search
CPC ..................................................... G06N 3/045
See application file for complete search history.

(56) References Cited

U.S. PATENT DOCUMENTS

| | | | | |
|---|---|---|---|---|
| 7,403,752 B2 * | 7/2008 | Raghavan | ........... | H04L 27/2601 |
| | | | | 455/119 |
| 7,426,247 B2 * | 9/2008 | Yang | ........................ | H04J 3/047 |
| | | | | 375/327 |
| 8,966,199 B2 * | 2/2015 | Nagano | ................. | G06F 3/0647 |
| | | | | 707/634 |
| 9,426,016 B2 | 8/2016 | Lee | | |
| 10,614,027 B2 | 4/2020 | Lee | | |
| 11,424,779 B2 * | 8/2022 | Ngo | ..................... | H04B 1/3805 |
| 11,669,474 B1 | 6/2023 | Lee | | |

* cited by examiner

*Primary Examiner* — Henry Tsai
*Assistant Examiner* — Juanito C Borromeo
(74) *Attorney, Agent, or Firm* — Vedder Price P.C.

(57) ABSTRACT

Multiple examples are disclosed of a multi-bus replicator using RF SerDes components for a chip-to-chip interconnect. In one example, a multi-bus replicator comprises an initiator write bus replication unit to receive write commands and write data from a plurality of write buses and to transmit the write commands and the write data using one or more RF SerDes transmitters; and a target write bus replication unit to receive the write commands and the write data from the RF SerDes transmitters and to provide the write commands and the write data on a plurality of write buses.

20 Claims, 8 Drawing Sheets initiator write bus
replication unit
251 target write bus replication unit
252 initiator read bus replication unit
253 target read bus replication unit
254

MULTI-BUS REPLICATOR USING RF SERIALIZER/DESERIALIZER FOR CHIP-TO-CHIP INTERCONNECT

TECHNICAL FIELD

Multiple examples are disclosed of a multi-bus replicator using RF serializer/deserializer (SerDes) components for chip-to-chip interconnect.

BACKGROUND

The advancement of System-on-Chip (SoC) design incorporating chiplet architecture has become a promising method to expand silicon content and reduce power consumption. However, this approach demands advanced packaging techniques, which considerably increase manufacturing costs and add complexity to chiplet design. U.S. Pat. No. 11,669,474, titled "Bus Pipeline Structure for Die-to-Die Interconnect and Chip," attempts to address these challenges by utilizing advanced packaging to minimize parasitic effects in signal transmission. Despite this, the cost and complexity associated with advanced packaging remain notably higher than those of conventional PCB motherboard solutions. Additionally, such die-to-die interconnects lack support for the complex multi-bus replication needed in heterogeneous high-performance computing environments with host processors and multiple co-processors.

Scaling silicon content without sole reliance on advanced packaging requires an interconnect solution that supports both the short traces within chiplets and the longer traces needed for chipsets on cost-effective, established motherboard technology. Such an interconnect must effectively mitigate the performance degradation from long traces on the motherboard to deliver performance on par with that of short traces in chiplet SoCs. Existing interconnect technologies, such as NVLINK, PCIe, USB, and Ethernet, while effective for chipset connections, operate on a transaction-by-transaction transfer basis. This characteristic restricts them from achieving real-time bus replication. As a result, these systems experience increased overhead from protocol layers, encoding-decoding processes, clock-data recovery, and lack full-duplex concurrent bus transfer capability, collectively limiting effective bandwidth.

Moreover, these transaction-based interconnects exhibit higher bit error rates due to their inability to ensure data integrity on every bus cycle, protecting only larger data packets during transactions. This approach leads to a higher bit error rate compared to buses with data protection on every clock cycle.

What is needed is an improved chip-to-chip interconnect that overcomes the challenges posed by existing interconnects.

SUMMARY OF THE INVENTION

The embodiments disclosed herein introduce an interconnect method and mechanisms that utilize RF SerDes. SerDes is known in the prior art. U.S. Pat. No. 9,426,016, titled "Self-Track Scheme for Multi-Frequency Band Serializer-Deserializer I/O Circuits," and U.S. Pat. No. 10,614,027, titled "Serial Bus with Embedded Side Band Communication," outline RF SerDes technology that offers benefits such as reduced latency, increased bandwidth, and enhanced data integrity through per-cycle data protection, outperforming established technologies like NVLINK and PCIe. The proposed embodiments utilize the advantages of SerDes—low latency, high bandwidth, low bit error rates, and low power consumption—to enable long-trace support for a multi-bus replicator.

The embodiments demonstrate how RF SerDes technology can be applied to construct a multi-bus replicator, facilitating the transfer of internal buses between chips over extended traces on a motherboard without needing advanced chiplet packaging. Unlike transactional protocol-based SerDes systems (e.g., NVLINK, PCIe, CXL), which cannot replicate buses on a cycle-by-cycle basis, these embodiments enable multi-bus replicators to consolidate all internal buses from each chip into a unified bus, emulating the performance of a large monolithic SoC.

The disclosed RF SerDes-based multi-bus replicators can achieve performance similar to the extremely short traces of chiplets with advanced packaging, even over longer motherboard traces. By replicating all internal buses from each chip's interconnect fabric, this approach establishes a unified memory access model (UMA) for software and firmware developers, avoiding the Non-Uniform Memory Access (NUMA) challenges inherent in transactional interconnects. This architecture is essential for scalable performance in multi-core, multi-processor heterogeneous systems such as AI platforms, where all processing units (CPU, GPU, NPU) access shared memory via a consistent bus with low latency and high bandwidth, effectively eliminating memory allocation and deallocation overhead.

In one example, a multi-bus replicator, comprises an initiator write bus replication unit to receive write commands and write data from a plurality of write buses and to transmit the write commands and the write data using one or more RF SerDes transmitters; and a target write bus replication unit to receive the write commands and the write data from the RF SerDes transmitters and to provide the write commands and the write data on a plurality of write buses.

In another example, a multi-bus replicator, comprises an initiator write bus replication unit; a target write bus replication unit; an initiator read bus replication unit; and a target read bus replication unit.

In another example, a method comprises receiving a write command and write data from one of a plurality of write buses; sending, by a RF SerDes transmitter, the write command and the write data; receiving, by a RF SerDes receiver, the write command and the write data; and sending the write command and the write data on one of a plurality of write buses.

In another example, a method comprises receiving a read command from a processor over a first read bus; sending, by a RF SerDes transmitter, the read command; receiving, by a RF SerDes receiver, the read command; and sending the read command to a memory unit over a second read bus.

DETAILED DESCRIPTION OF THE INVENTION

Figure 1:
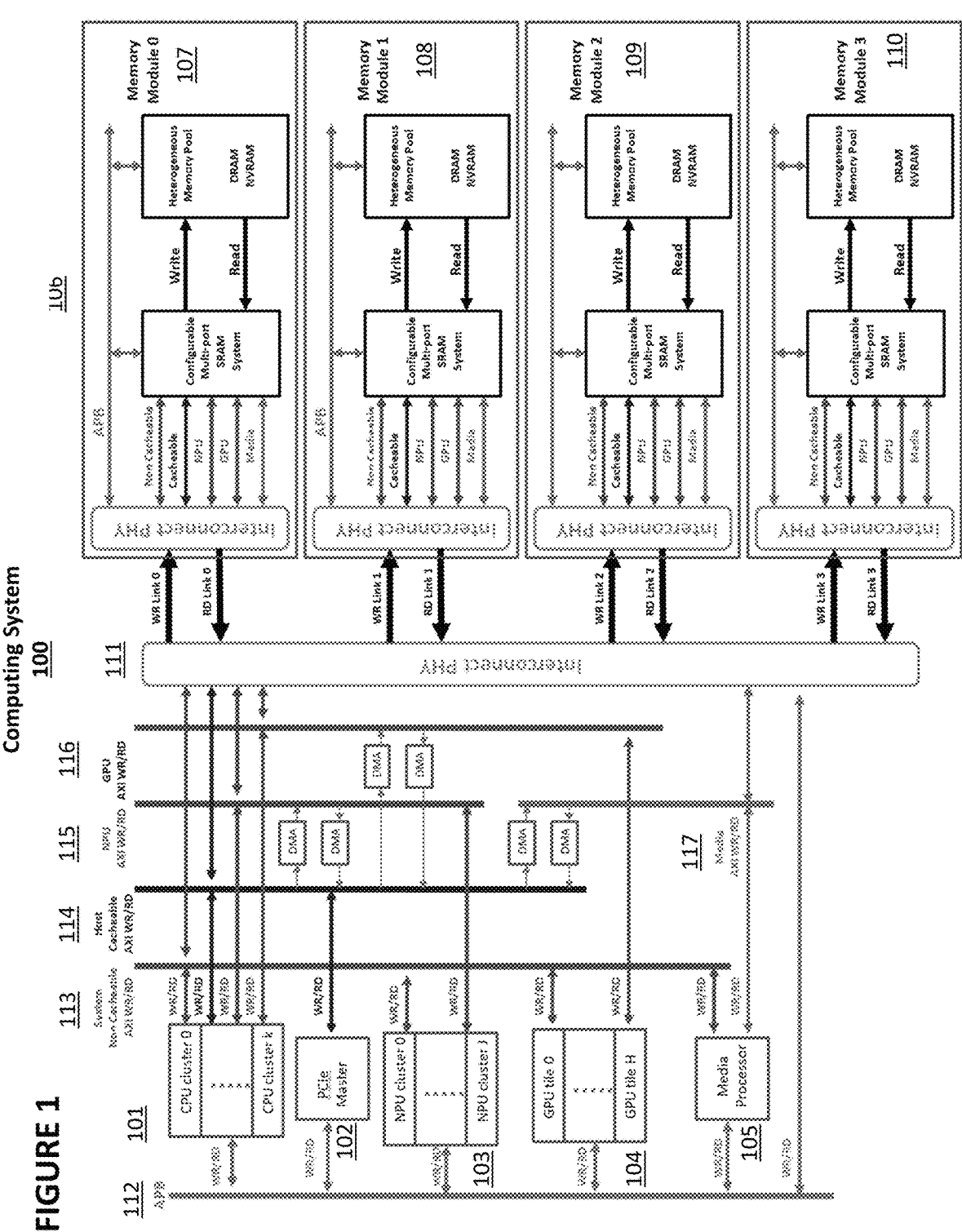
FIG. 1 depicts a computing system.

FIG. 1 depicts computing system 100 comprising host processor (CPU) 101 and various co-processors such as PCIe master 102, neural processing unit (NPU) 103, graphics processing unit (GPU) 104, and memory protection unit (MPU) 105. These components are interconnected to distributed memory pool 106, which is a hardware component configured in this example as a quad-module configuration comprising memory modules 107, 108, 109, and 110. The memory configuration is scalable, allowing the number of memory modules to be adjusted based on specific memory requirements. This flexibility includes the option to expand beyond the quad-module setup for increased memory capacity or reduce it for smaller memory needs. The memory modules 107, 108, 109, and 110 are physically separated from the SoC containing host processor 101 and co-processors 102, 103, 104, and 105 and can be monolithic, chiplet-based, or contained in another architecture.

An interconnect PHY 111 links memory modules 107, 108, 109, and 110 into distributed memory pool 106 that supports a Unified Memory Access (UMA) architecture, accessible to all host processor 101 and co-processors 102, 103, 104, and 105. UMA allows all processors to directly access target physical addresses in memory without the need for memory allocation or deallocation. Distributed memory pool 106 helps prevent memory collisions among concurrent processing units, resulting in improved performance scaling as the number of processing units increases. To accommodate the diverse bus cycle behaviors of different processors and their varying data coherency algorithms, the memory pool must support a range of bus cycle behaviors.

Interconnect PHY 111 shown in FIG. 1 performs multi-bus replication from the SoC to another chipset on each memory module, as also depicted in FIG. 1. The multi-bus in this example comprises an Advanced Peripheral Bus (APB) 112, a non-cacheable AXI bus 113, a cacheable AXI bus 114, an NPU AXI bus 115, a GPU AXI bus 116, and a media processor AXI bus 117. This multi-bus is extremely wide, requiring over 2,000 signal lines. To propagate these 2,000 signals to each memory module, a bus replicator is needed, which can lead to a significant number of signals, especially in a quad memory system, exceeding 8,000 signals between chipsets. Scaling this approach to an ultra-high-performance system with 32 memory modules would result in over 64,000 signals between chipsets on a single motherboard, becoming a significant bottleneck. To address this challenge, the invention uses RF SerDes to perform multi-bus replication. This approach can significantly reduce the number of signals between chipsets.

Figure 2:
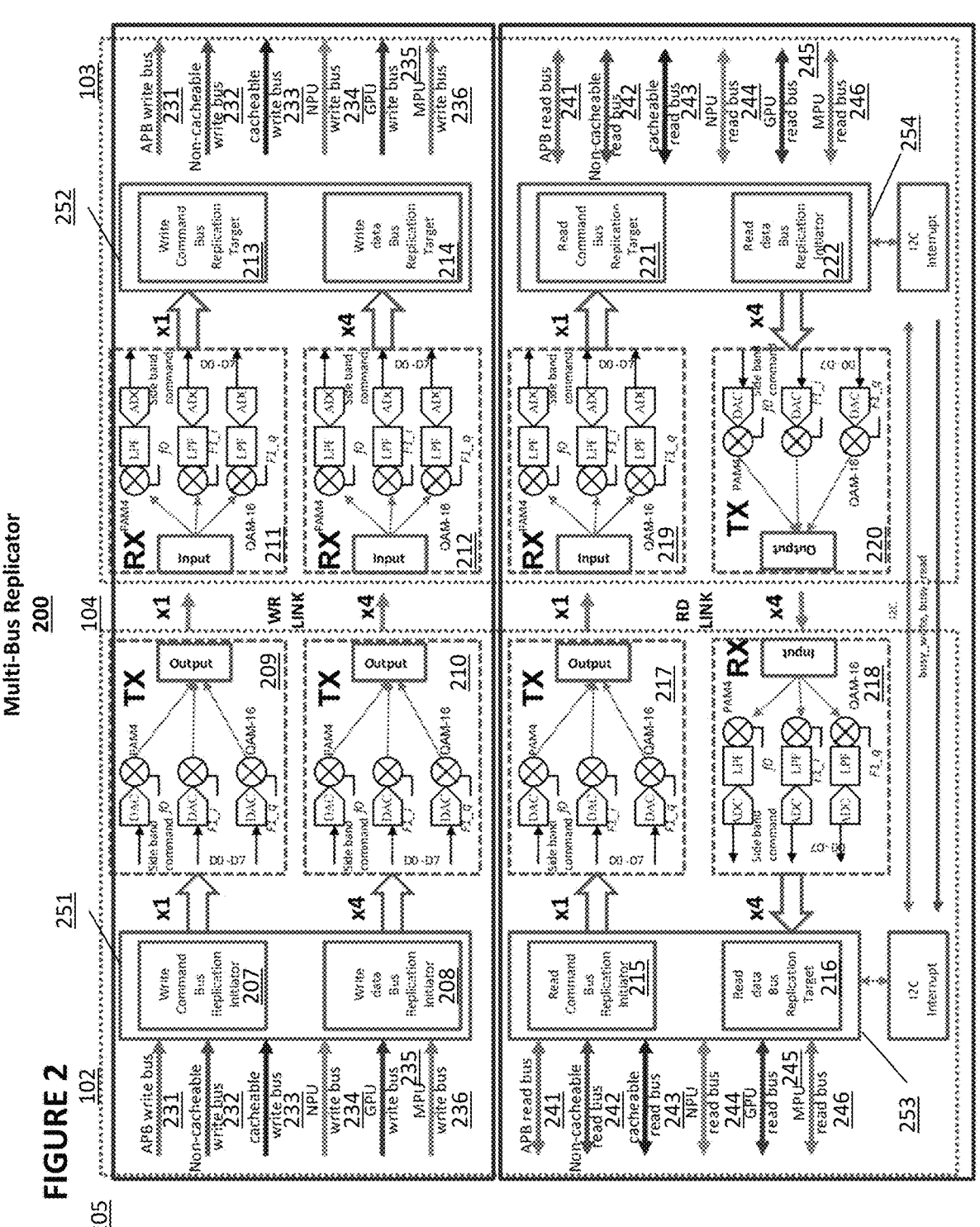
FIG. 2 depicts a multi-bus replicator.

FIG. 2 illustrates the circuit architecture of multi-bus replicator 200 inside the interconnect PHY 111 of FIG. 1. A portion of multi-bus replicator 200 is contained in an initiator (typically, an SoC containing one or more of processor 101 and co-processors 102, 103, 104, and 105), a portion of multi-bus replicator 200 is contained in a target (typically, one or more chips or chiplets containing distributed memory pool 106), and a portion of multi-bus replicator 200 is contained in a physical link between the initiator and the target.

Multi-bus replicator 200 comprises write link (WR Link) 205 and read link (RD Link) 206. These separate and dedicated links support full-duplex concurrent read and write operations, maximizing usable bandwidth by a factor of two, despite using a serial bus rather than a parallel bus.

Write link 205 comprises six write buses—APB bus 231, non-cacheable write bus 232, cacheable write bus 233, NPU bus 234, GPU bus 235, and MPU bus 236—which serve as inputs to initiator write bus replication unit 251, which comprises write command bus replication initiator 207 and write data bus replication initiator 208. The write command bus replication initiator 207 connects to one RF SerDes TX 209 in WR Link, while the write data bus replication initiator 208 connects to four RF SerDes TX units 210 in WR Link. A total of five RF SerDes TX units are used for the write cycle bus initiator in WR Link 205. The corresponding RF SerDes RX units 211 and 212 on another chipset in WR Link de-serialize the RF SerDes TX signals into the write command bus replication target 213 and write data bus replication target 214 in target write bus replication unit 252. The target then replicates the six write buses 231, 232, 233, 234, 235, and 236 from the SoC to another chipset.

Similarly, in read link 206, the six read buses from the SoC—APB bus 241, non-cacheable read bus 242, cacheable read bus 243, NPU bus 244, GPU bus 245, and MPU bus 246—connect to initiator read bus replication unit 253 comprising the read command bus replication initiator 215 and read data bus replication targets 216. The read command bus replication initiator 215 connects to one RF SerDes TX 217 on the SoC in RD Link 206, while the read data bus replication target 216 connects to four RF SerDes RX units 218 on the SoC in RD Link 206. A total of one RF SerDes TX unit 217 and four RF SerDes RX units 218 are used for the read cycle bus replicator on the SoC in RD Link. The corresponding RF SerDes RX unit 219 on another chipset in RD Link de-serializes the RF SerDes TX signals into the read command bus replication target 221 in target read bus replication unit 254. The return read data from the chipset is transmitted through the read data bus replication initiator 222 in target read bus replication unit 254 to four RF SerDes TX units 220 on the chipset, which connect to RF SerDes RX units 218 on the SoC to read data bus replication target 216.

Figure 3:
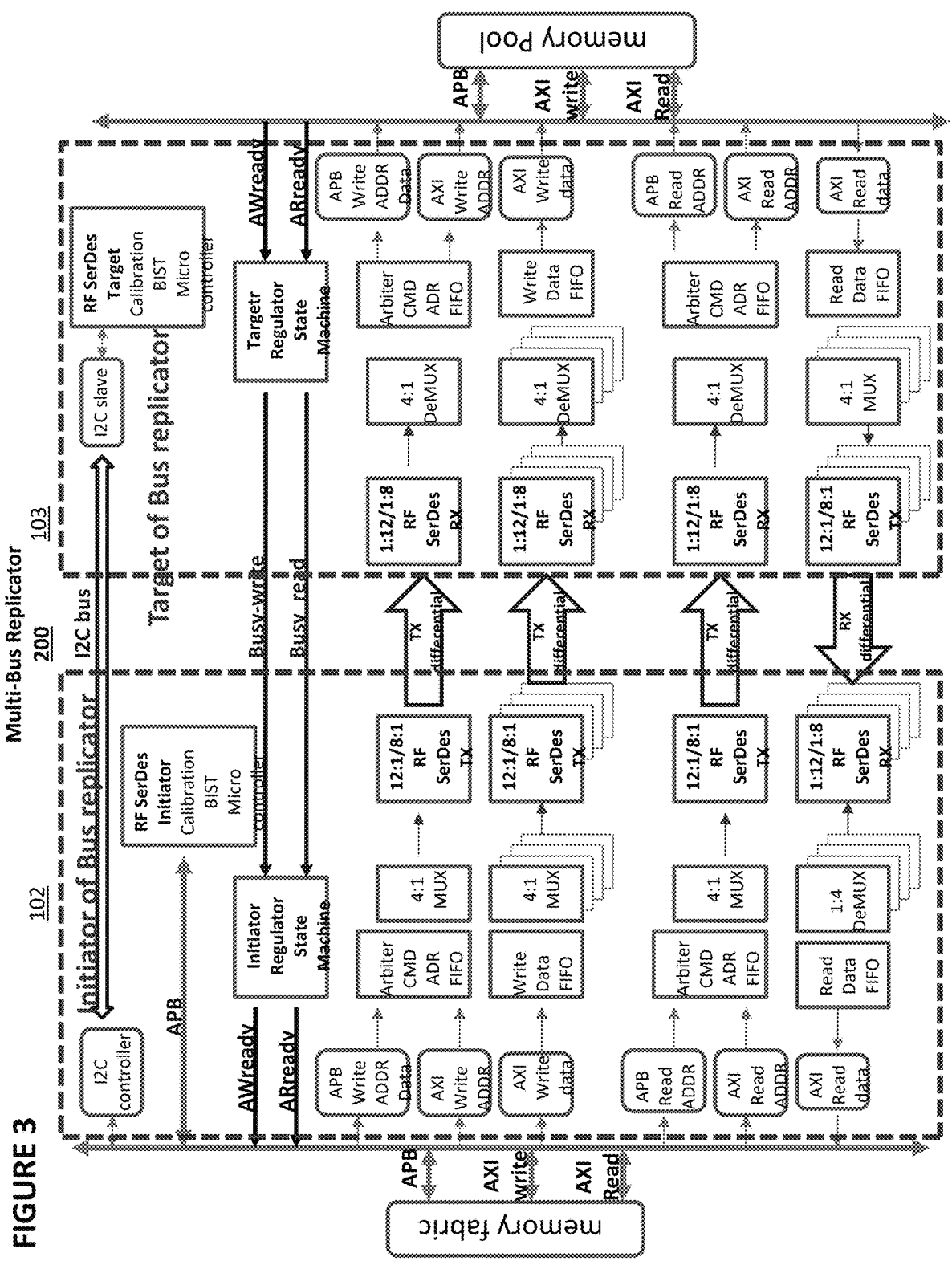
FIG. 3 depicts read and write bus replication by the multi-bus replicator of FIG. 2.

FIG. 3 depicts the resulting read and write bus replication. Multi-bus replicator 200 implements two busy signals, busy_write and busy_read, to prevent the initiator from overrunning the target when the target FIFO is full and unable to accept more cycles. It also implements a one-line I2C interface to facilitate communication during initialization and error handling, such as when ECC errors require a bus retry.

Figure 4:
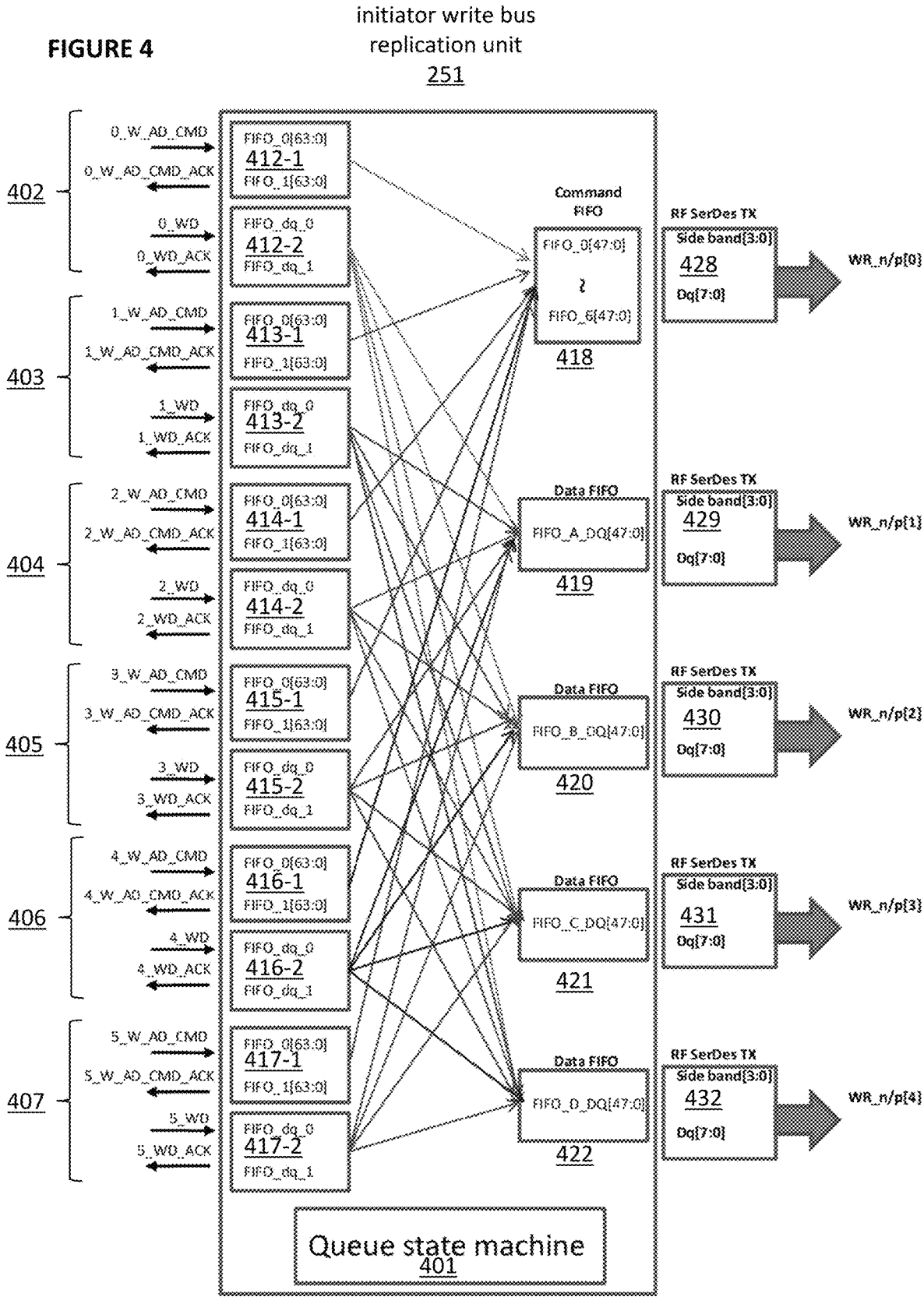
FIG. 4 depicts an initiator write bus replication unit.

FIG. 4 depicts additional detail regarding initiator write bus replication unit 251. Initiator write bus replication unit 251 comprises write command bus replication initiator 207, write data bus replication initiator 208, and queue state machine 401. There are six write bus master interfaces: APB write bus master interface 402, non-cacheable write bus master interface 403, cacheable write bus master interface 404, NPU write bus master interface 405, GPU write bus master interface 406, and MPU write bus master interface 407. Write bus master interfaces 402, 403, 404, 405, 406, and 407 are equipped with double ping-pong FIFO 412-1 and 412-2, 413-1 and 413-2, 414-1 and 414-2, 415-1 and 415-2, 416-1 and 416-2, and 417-1 and 417-2, respectively, to support pipelined bus requests for concurrent write cycles, maximizing bandwidth utilization.

Write command FIFO 418 has a queue depth of 7 to handle requests from the six multi-bus sources. The output of command FIFO 418 is serialized through the RF SerDes transmitter (TX) 428 with an 8-bit command transmitted via DQ and a 4-bit clock sideband transmitted through a sideband channel. Every four clock cycles, the RF SerDes TX, WR_n/p[0], can transmit a 32-bit write command along with a 16-bit clock sideband, totaling 48 bits of write command, address, and clock, to the multi-bus replicator target.

Each of the four data FIFOs 419, 420, 421, and 422 can also serialize 8-bit data with a 4-bit clock sideband, similar to the RF SerDes used for the command queue. Every four clock cycles, each RF SerDes Tx 429, 430, 431, and 432 can transmit over WR_n/p[1:4]32 bits of write data and corresponding sideband information, such as ECC, byte mask, and write clock, enabling the transmission of 128 bits of data and 64 bits of clock sideband through RF SerDes TX, WR_n/p[1:4]. The write cycle supports variable burst lengths, ranging from 1 to 16. For a burst length of 16, the write cycle can transmit 2K bits with its sideband information.

The RF SerDes clock operates at four times the bus clock rate because the interconnect fabric cannot operate at such high speeds due to long traces within the SoC. For example, if the interconnect fabric operates at 128 bits at 0.8 GHz, the RF SerDes operates at 3.2 GHz, modulated by a 16 GHz signal.

Queue state machine 401 in FIG. 4 manages the queuing of the six write bus master interfaces 402, 403, 404, 405, 406, and 407 and handles busy signals and interrupt requests from the bus replicator's target in the remote chipset. It fetches FIFO entries from one of the six write bus master interfaces 402, 403, 404, 405, 406, and 407 and transmits them via the RF SerDes.

Figure 5:
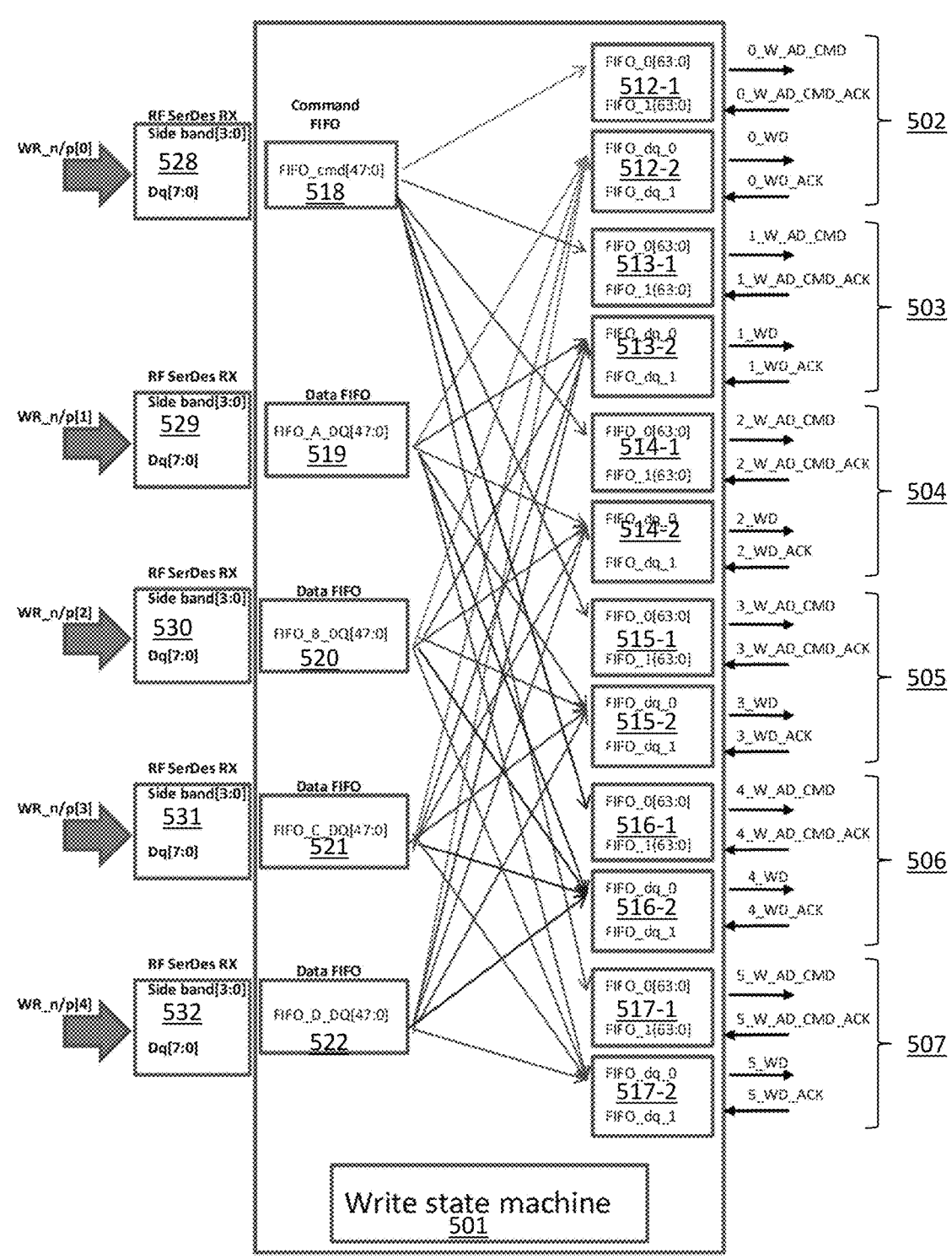
FIG. 5 depicts a target write bus replication unit.

FIG. 5 depicts additional detail regarding target write bus replication unit 252. Target write bus replication unit 252 comprises write command bus replication target 213, a write data bus replication target 214, and a write state machine 501. The target of the multi-bus write bus replicator is on another remote chipset to restore the bus request for six bus master interfaces: APB bus master interface 502, non-cacheable bus master interface 503, cacheable bus master interface 504, NPU bus master interface 505, GPU bus master interface 506, and MPU bus master interface 507, and generate the write bus command for the initiator on the remote SoC.

Write bus master interfaces 502, 503, 504, 505, 506, and 507 are equipped with double ping-pong FIFO 502-1 and 502-2, 503-1 and 503-2, 504-1 and 504-2, 505-1 and 505-2, 506-1 and 506-2, and 507-1 and 507-2, respectively, to prevent overruns by the initiator in the SoC. Once the write cycle is accepted by the remote chipset, it releases the busy signal to continue accepting write command requests.

RF SerDes RX 528, WR_n/p[0], on the remote chipset takes 4 clock cycles to restore the 48-bit data (32-bit command and 16-bit clock sideband) to the command FIFO 518. The command FIFO 518 forwards the command to the targeted write bus command FIFO (one of six write bus interfaces), which generates the write bus command to the remote chipset's memory pool or interconnect. When the remote chipset is overrun and cannot accept the write command, the write state machine 501 in the bus replicator generates a busy signal to halt the initiator from sending additional write cycle requests. The write clock is also transmitted through RF SerDes from the SoC to the remote chipset.

Similarly, each of RF SerDes RX 529, 530, 531, and 532, WR_n/p[1:4] on the remote chipset takes 4 clock cycles to restore the 48-bit data (32-bit data and 16-bit clock sideband) to the data FIFO 519, 520, 521, and 522. The data FIFO 519, 520, 521, and 522 forwards to the appropriate target write data FIFO based on the sideband information. The data FIFO 519, 520, 521, and 522 can replicate to complete data transfer, regulated by the write state machine, for burst lengths ranging from one to sixteen. A ping-pong FIFO is also used, similar to the command FIFO, to prevent overruns by the initiator of the write bus replicator.

In the remote chipset target, the clock is down-converted to one-fourth of the SerDes clock rate to synchronize with the slower interconnect fabric. This ensures that the bus replicator target remains in sync with the initiator. With the initiator and target of the multi-bus replicator configured as shown in FIGS. 4 and 5, write bus commands from the SoC can be replicated to the remote chipset, which can then generate its own write bus commands for its internal resources.

The SoC and remote chipset utilize multi-bus write replicators based on RF SerDes technology. Unlike PCIe and CXL, this non-transactional approach enables cycle-to-cycle replication in real time, maximizing concurrency and bandwidth utilization.

Figure 6:
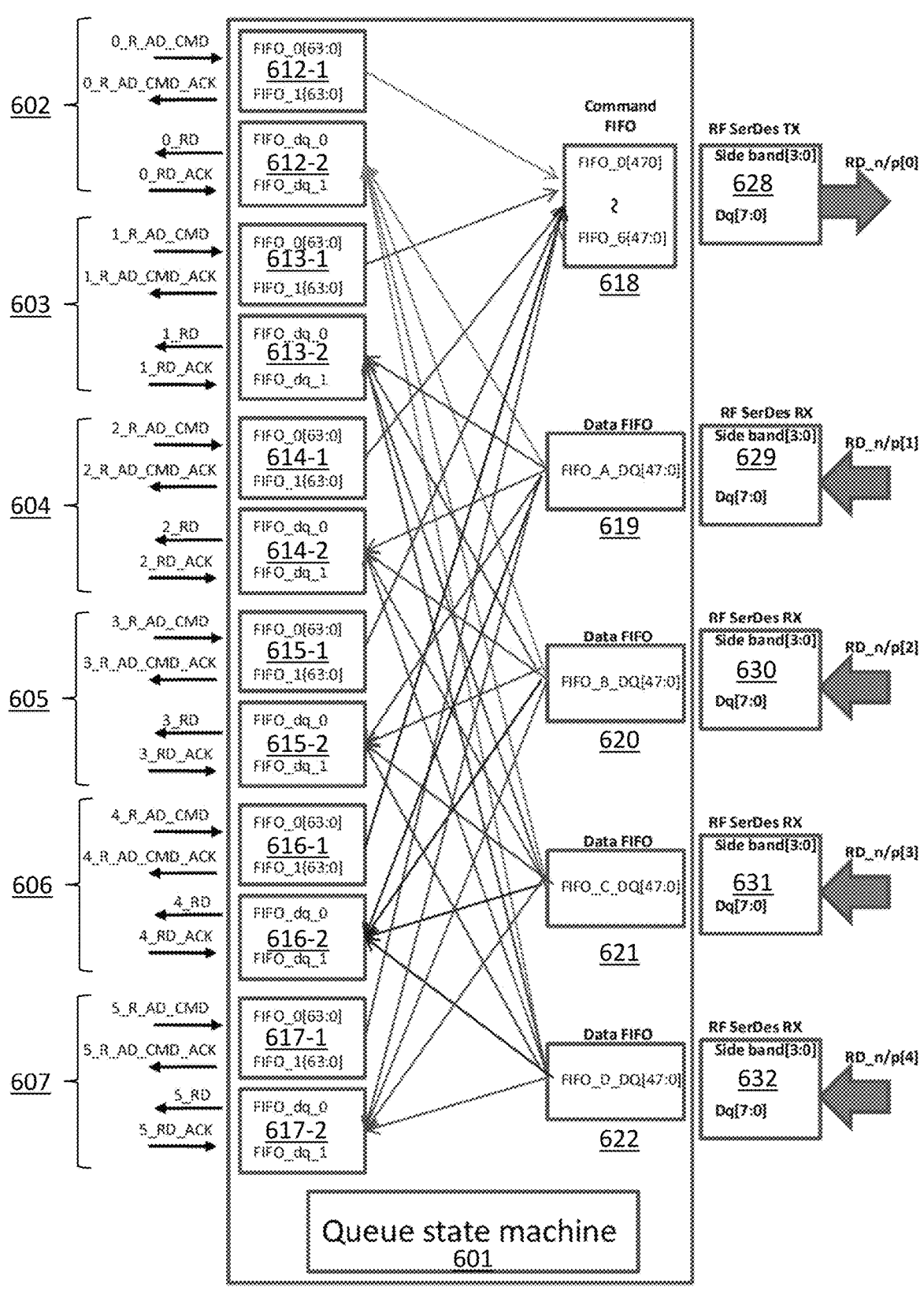
FIG. 6 depicts an initiator read bus replication unit.

FIG. 6 depicts initiator read bus replication unit 253. Initiator read bus replication unit 253 comprises one RF SerDes transmitter (TX) 628 labeled RD_n/p[0] and four RF SerDes receivers (RX) 629, 630, 631, and 632 labeled RD_n/p[1:4]. The read command bus FIFO 612-1 and 612-2 implements a double ping-pong FIFO interface to the interconnect fabric, similar to the write command FIFO in FIG. 4.

The read command FIFO 618 has a queue depth of seven to handle read requests from six read bus master interfaces: APB read bus master interface 602, non-cacheable read bus master interface 603, cacheable read bus master interface 604, NPU read bus master interface 605, GPU read bus master interface 606, and MPU read bus master interface 607. The command FIFO 618 is serialized through the RF SerDes TX 628, shown as RD_n/p[0], with an 8-bit command transmitted via DQ and a 4-bit clock sideband transmitted through a sideband channel. Every four SerDes clock cycles, the RF SerDes TX can transmit a 32-bit read command along with a 16-bit clock sideband, totaling 48 bits of read command, address, and clock, to the multi-bus replicator target. The command can be expanded by an additional 48 bits every four SerDes clock cycles. The SerDes clock operates at four times the speed of the interconnect clock, similar to the write bus replicator.

On the SoC, the read bus replicator strobes the returned data from the remote chipset. In FIG. 6, four RF SerDes RX units 629, 630, 631, and 632, RD_n/p[1:4], are connected to the remote chipset. Every four SerDes clock cycles, each RF SerDes returns 48 bits of data (32 bits of data and a 16-bit sideband). Therefore, RD_n/p[1:4] together return a total of 192 bits (128 bits of data and 64 bits of sideband). When the read bus replicator receives the data and sideband from the remote chipset, the sideband information from RF SerDes RX directs the corresponding data to the designated target among the six read bus masters shown in FIG. 6 through read command FIFOs 612-1 and 612-2 and read data FIFOs 613-1 and 613-2, 614-1 and 614-2, 615-1 and 615-2, 616-1 and 616-2, and 617-1 and 617-2, which implement a double ping-pong FIFO interface to the read bus masters, similar to the write FIFOs in FIG. 4.

The queue state machine 601 regulates and synchronizes the read cycle traffic between the interconnect of the SoC and the internal resources of the remote chipset.

Figure 7:
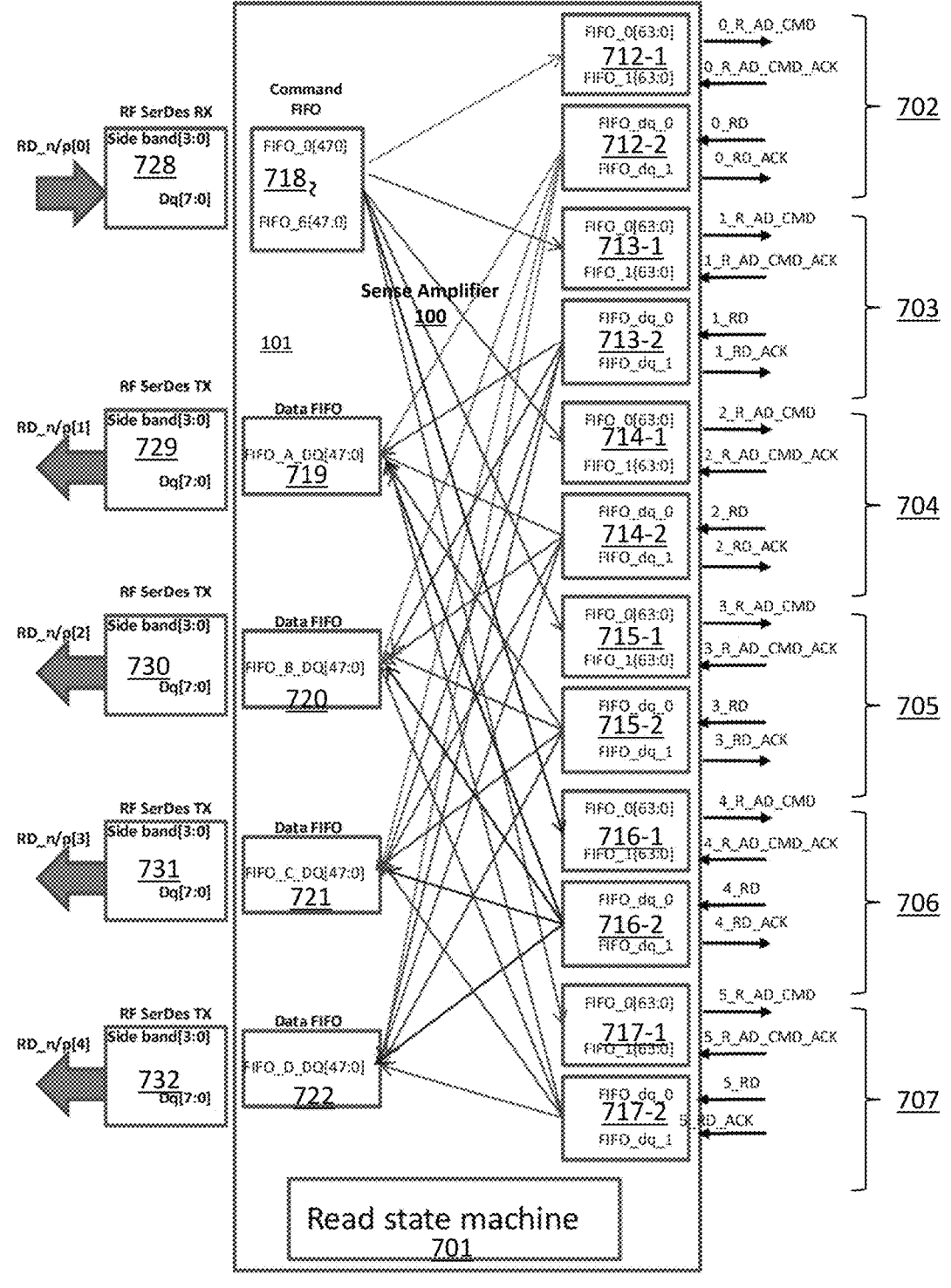
FIG. 7 depicts the target read bus replication unit.

FIG. 7 depicts additional detail regarding target read bus replication unit 254. Target read bus replication unit 254 comprises read command bus replication target 221, read data bus replication initiator 222, and read state machine 701. The target of the multi-bus read bus replicator is on another remote chipset to restore the bus request for six bus master interfaces: APB read bus master interface 702, non-cacheable read bus master interface 703, cacheable read bus master interface 704, NPU read bus master interface 705, GPU read bus master interface 706, and MPU read bus master interface 707 and generate the read bus command for the initiator on the remote SoC. Read bus master interfaces 702, 703, 704, 705, 706, and 707 are equipped with a double ping-pong FIFO 712-1 and 712-2, 713-1 and 713-2, 714-1 and 714-2, 715-1 and 715-2, 716-1 and 716-2, and 717-1 and 717-2 to prevent overruns by the initiator in the SoC. Once the read cycle is accepted by the remote chipset, it releases the busy signal to continue accepting read command requests.

The RF SerDes RX 728 (RD_n/p[0]) on the remote chipset takes 4 clock cycles to restore the 48-bit data (32-bit command and 16-bit clock sideband) to the command FIFO 718. The command FIFO 718 forwards the command to the targeted read bus command FIFO (one of six read bus interfaces), which generates the read bus command to the remote chipset's memory pool or interconnect. When the remote chipset is overrun and cannot accept the read command, the read state machine in the bus replicator generates a busy signal to halt the initiator from sending additional read cycle requests. The read clock is also transmitted through RF SerDes from the SoC to the remote chipset.

Similarly, each RF SerDes TX 729, 730, 731, and 732 (RD_n/p[1:4]) on the remote chipset takes 4 SerDes clock cycles to transmit the returned 48-bit data (32-bit data and 16-bit clock sideband) to the data FIFO 719, 720, 721, and 722. The data FIFO forwards to the appropriate target read data FIFO based on the sideband information. The data FIFO can replicate to complete data transfer, regulated by the read state machine, for burst lengths ranging from one to sixteen. A ping-pong FIFO is also used, similar to the command FIFO, to prevent overruns by the initiator of the read bus replicator.

With the initiator and target of the multi-bus replicator configured as shown in FIGS. 6 and 7, read bus commands from the SoC can be replicated to the remote chipset, which can then generate its own read bus commands for its internal resources. The returned read data is then replicated back to the SoC.

FIGS. 4, 5, 6, and 7 show that the read bus and write bus operate independently of one another and can operate concurrently to deliver full duplex operation. This can deliver effective bandwidth twice that of transactional SerDes protocols such as PCIe or CXL, which lack the capability to replicate bus commands in full duplex without the need for arbitration between read and write command requests.

The above implementation shows how to support a 128-bit bus with 4 pairs of RF SerDes TX/RX (WR_n/p[1:4] and RD_n/p[1:4]), with an additional dedicated two RF SerDes TX for separated read/write commands in the bus replicator. One can expand to support 256-bit or 512-bit buses to further increase the desired bandwidth. For a 256-bit bus, the implementation will need 8 pairs of RF SerDes TX/RX and an additional dedicated two RF SerDes TX for read/write commands. Because of the self-tracking scheme in RF SerDes, the problem of data skew is not a major concern with careful PCB layout for each bus replicator. The system can expand not only in data width but also in the number of bus replicators. The more bus replicators the system has, the higher bandwidth it can deliver.

Figure 8:
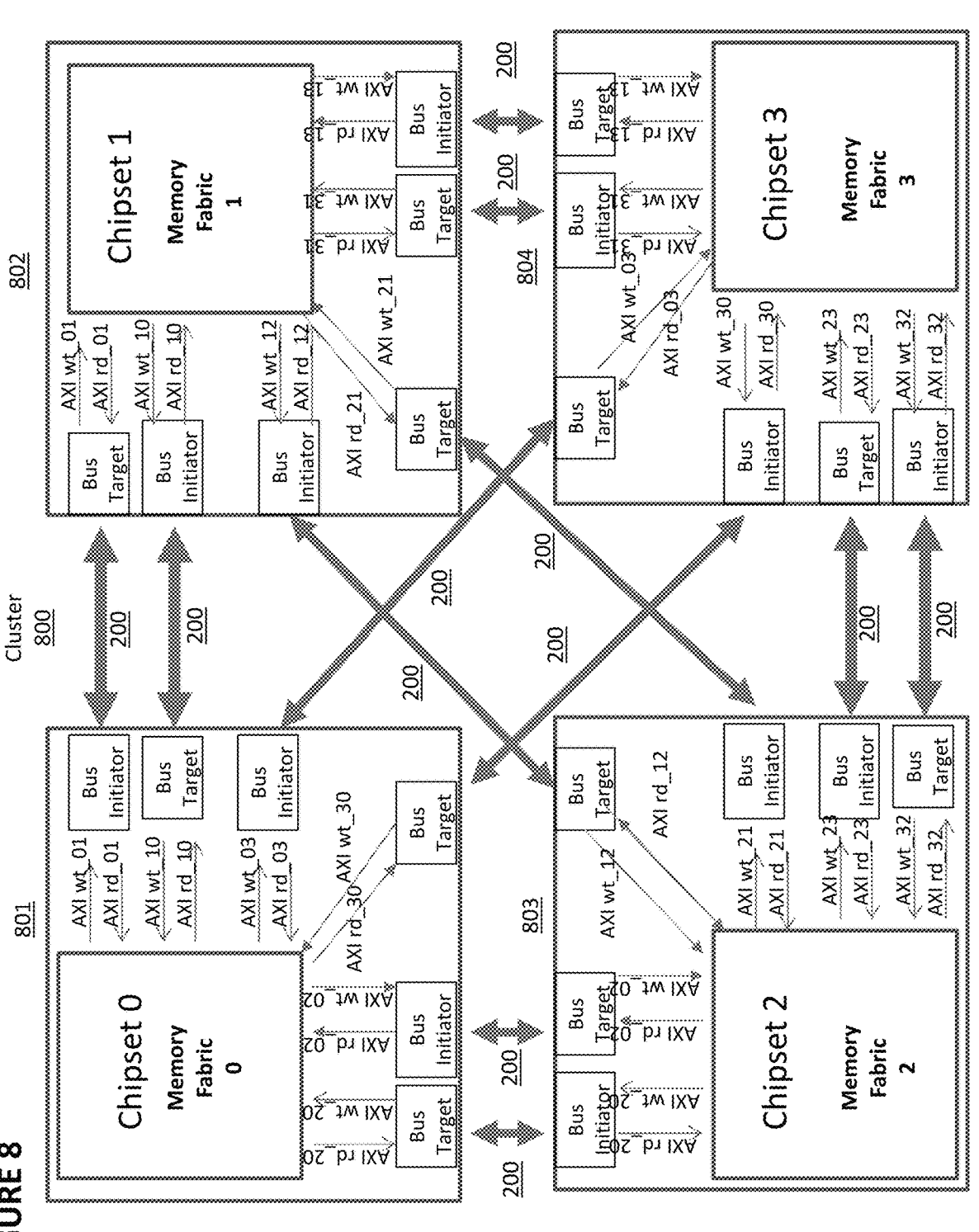
FIG. 8 depicts a cluster utilizing a plurality of multi-bus replicators.

FIG. 8 depicts cluster 800 that utilizes the embodiments described above. Cluster 800 comprises systems 801, 802, 803, and 804, each of which has a plurality of multi-bus replicators 200, where there are two multi-bus replicators between each pair of systems 801, 802, 803, 804 to enable each system to operate as to either the initiator or the target and to each of the other systems.

The operation and design of the embodiments described in FIGS. 1-8 can be summarized as follows.

1. The multi-bus replicator based on serial link RF SerDes comprises two separate and dedicated replicators: the write bus replicator and the read bus replicator. These two bus replicators can operate concurrently without requiring arbitration between read and write command requests, allowing them to handle cycle requests simultaneously. This design contrasts with transactional SerDes, such as PCIe or CXL, which require arbitration for command requests.

2. The write bus replicator consists of one RF SerDes for the write command protocol and four RF SerDes for the write data bus. The number of RF SerDes units can be expanded to support a wider bus interconnect. The example shown in FIGS. 4 and 5 supports a 128-bit wide interconnect fabric.

3. The write bus replicator implements an initiator of the multi-bus replicator on the bus master, shown in FIG. 4, that includes FIFOs to the interconnect fabric, a queue state machine, and FIFOs to the RF SerDes. The queue state machine regulates the transmission of write commands and writes data from six write bus masters.

4. The write bus replicator implements a target of multi-bus replicator on the remote chipset to regenerate command cycles from the write bus master on the initiator, as shown in FIG. 5. The write command and write data are transmitted through RF SerDes to the target, and the FIFO next to the RF SerDes converts side band and data into the parallel data bus. Subsequently, the content of the FIFO is transferred to one of six bus master interfaces based on the received write command.

5. The write state machine, shown in FIG. 5, regulates the FIFO traffic within the target of the write bus replicator. The write state machine also ensures the multi-bus write command on the remote chipset generates write cycles to the remote chipset's internal resources. This write bus replication ensures both chipsets execute write cycles as if they were executing within one large monolithic silicon chip.

6. The RF SerDes has data and side band ports to connect to the adjacent FIFO. In the write cycle, the write clock, write valid bit, byte mask, and encoded ECC are connected to the side band port of the RF SerDes. The write data and write command are connected to the data port of the RF SerDes.

7. The read bus replicator consists of one RF SerDes for the read command protocol and four RF SerDes for the read data bus. The number of RF SerDes can be expanded to support a wider bus interconnect. The example shown in FIGS. 6 and 7 supports a 128-bit wide interconnect fabric.

8. The read bus replicator implements an initiator within the multi-bus replicator on the bus master, as shown in FIG. 6. This initiator includes FIFOs connected to the interconnect fabric, a queue state machine, and FIFOs linked to the RF SerDes. The queue state machine regulates the transmission of read commands and data across six read bus masters. Unlike the initiator of the write bus replicator, the data port of the read bus replicator initiator functions as an RX (receiver) for RF SerDes rather than a TX (transmitter).

9. The read bus replicator implements a target within the multi-bus replicator on the remote chipset, as shown in FIG. 7, to regenerate command cycles from the read bus master on the initiator. The read command is transmitted through RF SerDes to the target, where the FIFO adjacent to the RF SerDes converts sideband and data into the parallel command bus. Subsequently, the read command bus protocol directs the command to one of six bus master interfaces, based on the received read command on the remote chipset. The remote chipset then returns the requested read data back to the FIFO of the target read bus replicator.

10. The read state machine, shown in FIG. 7, regulates how the request read data is transmitted back to the initiator of read bus replicator through RF SerDes. The read state machine also ensures the multi-bus read command on the remote chipset generates read cycles to the remote chipset's internal resources. This read bus replication ensures both chipsets execute read cycles as if they were executing within one large monolithic silicon chip.

11. The RF SerDes has data and sideband ports that connect to the adjacent FIFO. During the read cycle, the read clock, read valid bit, target bus master, and encoded ECC are connected to the sideband port of the RF SerDes, while the read data and read command are connected to the data port of the RF SerDes.

12. Besides expanding the number of RF SerDes within the read and write multi-bus replicators to increase data width and effectively boost bandwidth, the overall number of multi-bus replicators within a system can also be increased to enhance bandwidth. The bus replicator can be applied to PC motherboards as well as to advanced packages, such as those using a silicon interposer.

13. The multi-bus replicator using RF SerDes, unlike transactional SerDes such as PCIe or CXL, allows operation without requiring software protocols during data transmission and reception. Consequently, the RF SerDes-based multi-bus replicator is software-transparent across different hardware architectures, eliminating the additional latency overhead typically introduced by software protocols in transactional SerDes.

Materials, processes and numerical examples described above are mere examples, and should not be deemed to limit the claims. As used herein, the terms "over" and "on" both inclusively include "directly on" (no intermediate materials, elements or space disposed there between) and "indirectly on" (intermediate materials, elements or space disposed there between). Likewise, the term "adjacent" includes "directly adjacent" (no intermediate materials, elements or space disposed there between) and "indirectly adjacent" (intermediate materials, elements or space disposed there between). For example, forming an element "over a substrate" can include forming the element directly on the substrate with no intermediate materials/elements there between, as well as forming the element indirectly on the substrate with one or more intermediate materials/elements there between.

What is claimed is:

1. A multi-bus replicator, comprising:
an initiator write bus replication unit to receive write commands and write data from a first plurality of write buses and to transmit the write commands and the write data using one or more RF SerDes transmitters, each of the first plurality of write buses following a different bus protocol; and
a target write bus replication unit to receive the write commands and the write data from the RF SerDes transmitters and to replicate the write commands and the write data on a second plurality of write buses on a cycle-by-cycle basis, wherein the second plurality of write buses replicates the first plurality of write buses.

2. The multi-bus replicator of claim 1, wherein the first plurality of write buses and the second plurality of write buses each comprises two or more of an Advanced Peripheral Bus, a non-cacheable AXI bus, a cacheable AXI bus, a neural processing unit bus, a graphics processing unit bus, and a media processor bus.

3. The multi-bus replicator of claim 1, comprising:
an initiator read bus replication unit to receive read commands from a first plurality of read buses and to transmit the read commands using one or more RF SerDes transmitters; and
a target read bus replication unit to receive the read commands and to provide the read commands on a second plurality of read buses, wherein the second plurality of read buses replicates the first plurality of read buses.

4. The multi-bus replicator of claim 3,
wherein the target read bus replication unit is further configured to receive read data from a distributed memory pool in response to the read commands and to transmit the read data using one or more SerDes transmitters.

5. The multi-bus replicator of claim 4, wherein the initiator read bus replication unit is further configured to receive the read data from the target read bus replication unit.

6. A multi-bus replicator, comprising:
an initiator read bus replication unit to receive read commands from a first plurality of read buses and to transmit the read commands using one or more RF SerDes transmitters, each of the first plurality of read buses following a different bus protocol; and
a target read bus replication unit to receive the read commands and to replicate the read commands on a second plurality of read buses on a cycle-by-cycle basis, wherein the second plurality of read buses replicates the first plurality of read buses.

7. The multi-bus replicator of claim 6, wherein the first plurality of read buses and the second plurality of read buses each comprises two or more of an Advanced Peripheral Bus, a non-cacheable AXI bus, a cacheable AXI bus, a neural processing unit bus, a graphics processing unit bus, and a media processor bus.

8. The multi-bus replicator of claim 6,
wherein the target read bus replication unit is further configured to receive read data from a distributed memory pool in response to the read commands and to transmit the read data using one or more RF SerDes transmitters.

9. The multi-bus replicator of claim 8, wherein the initiator read bus replication unit is further configured to receive the read data from the target read bus replication unit.

10. A multi-bus replicator, comprising:
an initiator write bus replication unit coupled to a first plurality of buses, each of the first plurality of buses following a different bus protocol;
a target write bus replication unit coupled to a second plurality of buses, wherein the second plurality of buses replicates the first plurality of buses;
an initiator read bus replication unit coupled to the first plurality of buses; and
a target read bus replication unit coupled to the second plurality of buses;
wherein the initiator write bus replication unit and the target write bus replication unit are capable of performing write operations concurrently with the initiator read bus replication unit and the target read bus replication unit performing read operations.

11. The multi-bus replicator of claim 10, comprising:

an RF SerDes transmitter coupled to the initiator write bus replication unit; and an RF SerDes receiver coupled to the target write bus replication unit;

wherein the RF SerDes transmitter transmits to the RF SerDes receiver over a physical link.

12. The multi-bus replicator of claim 10, comprising:

a first RF SerDes transmitter coupled to the initiator read bus replication unit;

a first RF SerDes receiver coupled to the initiator read bus replication unit;

a second RF SerDes transmitter coupled to the target read bus replication unit; and a second RF SerDes receiver coupled to the target read bus replication unit;

wherein the first RF SerDes transmitter transmits to the second RF SerDes receiver over a physical link and the second RF SerDes transmitter transmits to the first SerDes receiver over the physical link.

13. A method comprising:

receiving a write command and write data from one of a first plurality of write buses, each of the first plurality of write buses following a different bus protocol;

sending, by a RF SerDes transmitter, the write command and the write data;

receiving, by a RF SerDes receiver, the write command and the write data; and replicating the write command and the write data on one of a second plurality of write buses on a cycle-by-cycle basis, wherein the second plurality of write buses replicates the first plurality of write buses.

14. The method of claim 13, wherein the first plurality of write buses comprises two or more of an Advanced Peripheral Bus, a non-cacheable AXI bus, a cacheable AXI bus, a neural processing unit bus, a graphics processing unit bus, and a media processor bus.

15. The method of claim 14, wherein the second plurality of write buses comprises two or more of an Advanced Peripheral Bus, a non-cacheable AXI bus, a cacheable AXI bus, a neural processing unit bus, a graphics processing unit bus, and a media processor bus.

16. A method comprising:

receiving a read command from a processor over one of a first plurality of read buses each of the first plurality of read buses following a different bus protocol;

sending, by a RF SerDes transmitter, the read command;

receiving, by a RF SerDes receiver, the read command; and replicating the read command to a memory unit over one of a second plurality of read buses on a cycle-by-cycle basis, wherein the second plurality of read buses replicates the first plurality of read buses.

17. The method of claim 16, wherein the first plurality of read buses comprises two of an Advanced Peripheral Bus, a non-cacheable AXI bus, a cacheable AXI bus, a neural processing unit bus, a graphics processing unit bus, and a media processor bus.

18. The method of claim 17, wherein the second plurality of read buses comprises two of an Advanced Peripheral Bus, a non-cacheable AXI bus, a cacheable AXI bus, a neural processing unit bus, a graphics processing unit bus, and a media processor bus.

19. The method of claim 16, comprising:

receiving read data from the memory unit over the one of a second plurality of read buses.

20. The method of claim 19, comprising:

sending, by a RF SerDes transmitter, the read data;

receiving, by a RF SerDes receiver, the read data; and sending the read data to the processor over the one of a first plurality of read buses.

* * * * *